United States Patent [19]

Degnan et al.

[11] Patent Number: 5,369,071
[45] Date of Patent: Nov. 29, 1994

[54] MANUFACTURE OF IMPROVED CATALYST

[75] Inventors: Thomas F. Degnan, Moorestown; Donald J. Klocke, Somerdale, both of N.J.; Mae K. Rubin, Bala Cynwyd, Pa.

[73] Assignee: Mobil Oil Corporation, Fairfax, Va.

[21] Appl. No.: 988,992

[22] Filed: Dec. 11, 1992

[51] Int. Cl.$^5$ .............................................. B01J 29/28
[52] U.S. Cl. ......................................... 502/71; 502/77
[58] Field of Search .................................. 502/71, 77

[56] References Cited

U.S. PATENT DOCUMENTS

| | | | |
|---|---|---|---|
| Re. 29,948 | 3/1979 | Dwyer et al. | 208/110 |
| 3,702,886 | 11/1972 | Argauer et al. | 423/328 |
| 4,100,262 | 7/1978 | Pelrine | 423/329 |
| 4,139,600 | 2/1979 | Rollmann et al. | 423/329 |
| 4,151,189 | 4/1979 | Rubin et al. | 260/448 |
| 4,296,083 | 10/1981 | Rollmann | 423/329 |
| 4,341,748 | 7/1982 | Plank et al. | 423/328 |
| 4,585,638 | 4/1986 | Kuhl | 423/328 |
| 4,592,902 | 6/1986 | Valyocsik | 423/328 |
| 5,055,437 | 10/1991 | Herbst et al. | 502/71 |
| 5,145,659 | 9/1992 | McWilliams | 502/71 |

OTHER PUBLICATIONS

Lok, B. M. et al., "The role of organic molecules in molecular sieve synthesis", Zeolites, vol. 3, 282-291 (1983).

*Primary Examiner*—Carl F. Dees
*Attorney, Agent, or Firm*—A. J. McKillop; D. P. Santini; G. L. Harris

[57] ABSTRACT

This invention relates to a new and useful method for manufacturing a catalyst composition comprising a crystalline molecular sieve having the structure of ZSM-5 and a matrix material, the new catalyst composition, and use of the new catalyst composition in accordance herewith as a catalyst component for organic compound, e.g., hydrocarbon compound, conversion.

26 Claims, No Drawings

MANUFACTURE OF IMPROVED CATALYST

BACKGROUND OF THE INVENTION

1. Field of the Invention

This invention relates to a new and useful method for manufacturing a catalyst composition comprising a crystalline molecular sieve having the structure of ZSM-5 and a matrix material, the new catalyst composition, and use of the new catalyst composition in accordance herewith as a catalyst component for organic compound, e.g., hydrocarbon compound, conversion.

More particularly, this invention relates to a method for preparing a catalyst composition comprising ZSM-5 crystals, wherein the ZSM-5 is synthesized in a special way to impart certain valuable physical properties and handling characteristics to catalyst comprising same.

2. Discussion of the Prior Art

Crystalline ZSM-5 and its conventional preparation are taught by U.S. Pat. No. 3,702,886, the entire disclosure of which is incorporated herein by reference. It has a distinctive X-ray diffraction pattern which identifies it from other known crystalline materials. A crystalline material composition having the structure of ZSM-5 is taught in U.S. Pat. No. Re. 29,948, the entire disclosure of which is incorporated herein by reference.

U.S. Pat, No. 4,139,600 teaches a method for synthesis of zeolite ZSM-5 from a reaction mixture comprising, as a directing agent, an alkyldiamine. U.S. Pat. No. 4,296,083 claims synthesizing zeolites characterized by a Constraint Index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,341,748 shows synthesis of ZSM-5 structure from reaction mixtures comprising ethanol, ZSM-5 seeds, ethanol and seeds, ethanol and ammonium hydroxide, and ethanol, ammonium hydroxide and ZSM-5 seeds. U.S. Pat. No. 4,100,262 teaches synthesis of ZSM-5 from a reaction mixture comprising a tetraalkylammonium source and a tetraureacobalt (II) complex.

Lok et al. (3 Zeolites, 282–291 (1983)) teach numerous organic compounds which act as directing agents for synthesis of various crystalline materials, such as, for example, ZSM-5, ZSM-11, ZSM-12, ZSM-20, ZSM-35, ZSM-48, AlPO$_4$-5, AlPO$_4$-8, AlPO$_4$-20 and others.

Other publications teaching various organic directing agents for synthesis of crystalline ZSM-5 include, for example, U.S. Pat. No. 4,592,902, teaching use of an alkyltropinium directing agent, alkyl being of 2 to 5 carbon atoms; and U.S. Pat. No. 4,585,638, teaching use of diquaternary (alkyl)$_3$N$^+$(CH$_2$)$_6$N$^+$(alkyl)$_3$, alkyl being propyl or butyl.

SUMMARY OF THE INVENTION

An economical and reproducible method for preparing an improved catalyst composition comprising crystals having the structure of ZSM-5 exhibiting valuable catalytic activity and selectivity and other valuable properties is provided. The method comprises forming a special reaction mixture hydrogel, having a pH of from about 10 to about 14, preferably from about 11.5 to about 13.5, and containing sources of alkali or alkaline earth metal (M) cations; an oxide of trivalent element (X), e.g., aluminum, boron, iron, gallium, indium and mixtures thereof; an oxide of tetravalent element (Y), e.g., silicon, germanium, tin and mixtures thereof; n-propylamine directing agent (R); and water, said reaction mixture having a composition in terms of mole ratios, within the following ranges:

| Reactants | Useful | Preferred |
| --- | --- | --- |
| YO$_2$/X$_2$O$_3$ | <40 | 20 to 35 |
| H$_2$O/YO$_2$ | 10 to 35 | 10 to 30 |
| OH$^-$/YO$_2$ | 0.1 to 0.3 | 0.1 to 0.2 |
| M/YO$_2$ | 0.2 to 0.6 | 0.3 to 0.5 |
| R/YO$_2$ | 0.01 to 0.6 | 0.02 to 0.3 |

The method further comprises maintaining the reaction mixture until crystals of the ZSM-5 structure are formed. Reaction conditions required consist of heating the foregoing reaction mixture to a temperature of from about 100° C. to about 200° C. for a period of time of from about 10 hours to about 100 hours. A more preferred temperature range is from about 130° C. to about 180° C. with the amount of time at a temperature in such range being from about 20 hours to about 60 hours. The solid product comprising ZSM-5 crystals is recovered from the reaction medium, as by cooling the whole to room temperature, filtering and water washing.

The next step of the method involves ammonium exchanging the recovered as-synthesized crystals such as by contact with, for example, ammonium nitrate, sulfate, and/or halide, e.g., chloride, solution. The exchanged crystals may then be washed with, for example, deionized water, and dried.

The ion-exchanged crystalline material is then deagglomerated. This may be accomplished, for example, by ball milling an aqueous slurry of the crystalline material.

The deagglomerated crystalline ZSM-5 material is then slurried with matrix material such as, for example, silica, clay, and/or alumina, at a pH of from about 2 to about 12, preferably from about 4 to about 6, to yield a ZSM-5/matrix material comprising from about 5 to about 80 wt.% ZSM-5 and from about 20 to about 95 wt.% matrix.

The final ZSM-5/matrix slurry is then dried, such as, for example, by spray drying to form a fluid powder.

This dried ZSM-5/matrix catalyst material is then converted to the protonic form. This conversion may be accomplished by, for example, acid treatment, ammonium exchange, and/or calcination. If acid treatment or ammonium exchange is performed, calcination will follow.

Acid treatment for this purpose comprises, for example, contacting the dried ZSM-5/matrix catalyst material with a 0.1 to about 1N mineral acid such as, for example, hydrochloric acid, or a carboxylic or dicarboxylic acid such as, for example, oxalic acid, at room temperature or a temperature up to about 150° C. for a time sufficient to provide the protonic form of the catalyst. The acid treated catalyst material may be washed with, for example, deionized water and again dried at a temperature of, for example, from about 65° C. to about 315° C.

Ammonium exchange for this purpose comprises, for example, contacting the dried ZSM-5/matrix catalyst material with ammonium nitrate, sulfate, hydroxide, and/or halide solution, washing the exchanged catalyst material with, for example, deionized water, and again drying the product catalyst material at a temperature of, for example, from about 65° C. to about 315° C.

The dried ZSM-5/matrix catalyst material, whether acid treated or ammonium exchanged or not, is then calcined at a temperature of from about 200° C. to about 550° C. for from about 1 minute to about 48 hours. The calcined ZSM-5/matrix catalyst will have an Alpha Value of greater than about 30, usually from greater than about 30 to about 1200. A preferred calcination procedure in accordance herewith would be to provide a calcined product catalyst which retains a trace amount of carbon residue. Therefore, partial calcination within the above conditions, e.g., at lower temperature and/or shorter time, is preferred.

Optionally, the calcined catalyst material may be subjected to steaming in an atmosphere of from about 5 to about 100% steam for at least about 1 hour, e.g., from about 1 hour to about 200 hours, at a temperature of at least about 300° C., e.g., from about 300° C. to about 800° C. The resulting steamed catalyst will have an Alpha Value of from about 1 to about 10. If the catalyst of this invention is to be used as an additive catalyst for hydrocarbon cracking, i.e., FCC or TCC, it is preferred not to steam it in accordance with this optional steaming step.

EMBODIMENTS

The reaction mixture required for synthesis of the ZSM-5 for use in this invention is X-rich, e.g., aluminum-rich, with a $YO_2/X_2O_3$ molar ratio of less than about 40, preferably from about 20/1 to about 35/1. Relative to other ZSM-5 synthesis methods, the reaction mixture used here also has a high pH, high $OH^-/YO_2$ molar ratio, high alkali or alkaline earth metal content and low water/$YO_2$ ratio. Also, the reaction time for crystallization is short by comparison.

It should be noted that the ratio of components of the reaction mixture required for synthesis of the ZSM-5 crystals for use herein is critical to achieve maximum effectiveness. For instance, if the $YO_2/X_2O_3$ ratio is greater than about 40, the product catalyst will be lower in activity. If the pH is allowed to drop below about 10 and crystallization reaction time is increased beyond about 100 hours, crystals form which do not provide all the benefits of the present catalyst.

The synthesis of the present invention is facilitated when the reaction mixture comprises seed crystals, such as those having the structure of ZSM-5. The use of at least 0.01%, preferably about 0.10%, and even more preferably about 1% seed crystals (based on total weight) of crystalline material will be useful.

The reaction mixture composition for the synthesis of ZSM-5 crystals can be prepared utilizing materials which supply the appropriate oxide. The useful sources of $X_2O_3$, e.g., aluminum oxide, iron oxide and/or boron oxide, include, as non-limiting examples, any known form of such oxide, e.g., aluminum oxide or hydroxide, organic or inorganic salt or compound, e.g., alumina, aluminates and borates. The useful sources of $YO_2$, e.g., silicon oxide, include, as non-limiting examples, known forms of such oxide, e.g., silicic acid or silicon dioxide, alkoxy-or other compounds of silicon, including silica gel and silica hydrosol.

It will be understood that each oxide component utilized in the reaction mixture for this synthesis can be supplied by one or more essential reactants and they can be mixed together in any order. For example, any oxide can be supplied by an aqueous solution. The reaction mixture can be prepared either batchwise or continuously. Crystal size and crystallization time for the product composition comprising the ZSM-5 crystals will vary with the exact nature of the reaction mixture employed within the above limitations.

The ZSM-5 crystal composition prepared hereby has a characteristic X-ray diffraction pattern, including values substantially as set forth in Table 1, hereinafter.

TABLE 1

| Interplanar d-Spacing, (A) | Relative Intensity ($I/I_o$) |
|---|---|
| 11.00 ± 0.25 | s–vs |
| 9.80 ± 0.30 | m–vs |
| 6.70 ± 0.10 | w |
| 6.30 ± 0.10 | w |
| 5.98 ± 0.10 | w |
| 5.55 ± 0.10 | w |
| 5.00 ± 0.10 | w |
| 4.36 ± 0.10 | w |
| 4.25 ± 0.08 | w |
| 4.08 ± 0.05 | w |
| 3.85 ± 0.07 | m–vs |
| 3.71 ± 0.05 | w–m |
| 3.62 ± 0.04 | w |
| 3.04 ± 0.03 | w |
| 2.99 ± 0.02 | w |

These X-ray diffraction data were collected with a Philips diffraction system, equipped with a graphite diffracted beam monochromator and scintillation counter, using copper K-alpha radiation. The diffraction data were recorded by step-scanning at 0.04 degrees of two-theta, where theta is the Bragg angle, and a counting time of 4 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (60–100), s=strong (40–60), m=medium (20–40) and w=weak (0–20). It should be understood that diffraction data listed for this sample as single lines may consist of multiple overlapping lines which under certain conditions, such as differences in crystallite sizes or very high experimental resolution or crystallographic change, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, and thermal and/or hydrothermal history.

The crystalline ZSM-5 material prepared hereby has a composition involving the molar relationship:

$$X_2O_3:(y)YO_2$$

wherein X is a trivalent element, such as aluminum, boron, iron, indium and/or gallium, preferably aluminum; Y is a tetravalent element, such as silicon, tin and/or germanium, preferably silicon; and y is less than about 30, usually from about 20 to less than about 30, more usually from about 23 to less than about 30. In the as-synthesized form, the crystalline material has a formula, on an anhydrous basis and in terms of moles of oxides per y moles of $YO_2$, as follows:

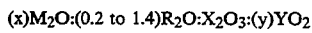

$(x)M_2O:(0.2 \text{ to } 1.4)R_2O:X_2O_3:(y)YO_2$ wherein X, Y, y, M, and R are as defined above and x is greater than 0.1, usually greater than about 0.3, most often from greater than about 0.4 to about 1.4. The M and R components are associated with the material as a result of their presence during crystallization, and may be reduced or removed by post-crystallization methods herein more particularly described.

The thermal decomposition product of the newly synthesized ZSM-5 can be prepared by heating, i.e., calcining, same at a temperature of from about 200° C. to about 550° C. for from 1 hour to about 48 hours in air or other inert gas.

Original ions, e.g., alkali or alkaline earth metal, of the as-synthesized ZSM-5 material and any found in the ZSM-5/matrix material can be replaced in accordance with techniques well known in the art, at least in part, by ion exchange with other ions. For the present catalyst composition, preferred replacing ions include hydrogen ions and hydrogen precursor, e.g., ammonium, ions. Typical ion exchange technique would be to contact the synthetic ZSM-5 material or ZSM-5/matrix material with a salt of the desired replacing ion or ions. Examples of such salts include the halides, e.g., chlorides, nitrates and sulfates. Representative ion exchange techniques are disclosed in a wide variety of patents including U.S. Pat. Nos. 3,140,249; 3,140,251; and 3,140,253.

Following contact with the salt solution of the desired replacing ion, the ZSM-5 or ZSM-5/matrix material is then preferably washed with water and dried at a temperature ranging from 65° C. to about 315° C. The final calcination of the catalyst product of this invention, i.e., following ion exchange of the ZSM-5/matrix material, will be in air or other inert gas at a temperature of from about 200° C. to about 550° C. for a time of from about 1 minute to about 48 hours or more. This final calcination is preferred to be partial so that trace amounts of carbon residue remain on the ZSM-5/matrix catalyst material.

The ZSM-5 crystals hereby prepared are incorporated with matrix material resistant to the temperatures and other conditions employed in certain organic conversion processes. Such matrix materials include inorganic materials such as clays, e.g., bentonite and/or kaolin, silica and/or metal oxides, e.g., alumina, titania and/or zirconia. The latter may be either naturally occurring or in the form of gelatinous precipitates, sols or gels including mixtures of silica and metal oxides. These matrix materials, i.e., clays, oxides, etc., function, in part, as binders for the catalyst. It is desirable to provide a catalyst having good crush strength because in a petroleum refinery the catalyst is often subjected to rough handling, which tends to break the catalyst down into powder-like materials which cause problems in processing.

Naturally occurring clays which can be composited with the crystalline ZSM-5 material include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the matrix material may be silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix material can be in the form of a cogel. A mixture of these components could also be used.

The relative proportions of finely divided crystalline ZSM-5 and matrix material vary widely with the crystalline material content ranging from about 5 to about 80 percent by weight, and more usually in the range of about 5 to about 50 percent by weight of the composite.

The calcined catalyst material of this invention may be contacted with steam to reduce the Alpha Value to within certain limits, i.e., Alpha Value of from about 1 to about 10. Suitable steaming conditions include contact with 5–100% steam at a temperature of at least 300° C., e.g., 300°–800° C., for a time sufficient to obtain the required Alpha Value, usually at least 1 hour, e.g., 1–200 hours, at a pressure of 100–2,500 kPa. In a more particular embodiment, the catalyst can be made to undergo steaming with 75–100% steam at 315°–700° C., and atmospheric pressure for 2–25 hours. If the catalyst material of this invention is to be added to an FCC or TCC regenerator as additive catalyst, it is preferred that it not be steamed as indicated here.

The catalyst of this invention is easier to process than other similar catalysts and provides unique activity and selectivity in commercial applications, such as, for example, as an additive catalyst in catalytic cracking. As an additive catalyst in a hydrocarbon cracking process, the present catalyst leads to product rich in higher octane gasoline, alkylate, gasoline plus potential alkylate and lower olefins, with selectivity toward high quality propylene. Such a hydrocarbon cracking process uses a catalyst composition comprising a large-pore molecular sieve, such as, for example, REY or REUSY, and an additive catalyst comprising ZSM-5 having been synthesized and formulated in accordance with this invention to provide significantly improved product.

The catalyst composition for use in the cracking process may be prepared by combining a slurry of the large-pore molecular sieve, e.g., REY, and a slurry comprising matrix material. The combined slurries may be dewatered, reslurried, homogenized, and spray dried.

In the process for cracking a hydrocarbon feedstock, the feedstock is contacted under catalytic cracking conditions with a catalyst composition comprising a large-pore molecular sieve and the additive catalyst prepared by the present invention to yield the improved product.

It has been found that the use of a minor amount of the present improved additive catalyst along with cracking catalyst in a fluidized-bed cracking process leads to an unexpected shift in product composition as compared with the same process using the cracking catalyst alone or with a different additive catalyst. The yield shift results in gasoline of higher octane than without ZSM-5 as indicated by an increase in gasoline RON, MON, and an increase in gasoline plus potential alkylate RON. RON signifies the research octane number, MON signifies the motor octane number, and the terms are used to describe the knocking characteristics of gasoline, that is, its combustion behavior. The yield shift also results in an increase in $C_3$ and $C_4$ olefins, especially propylene, which are valuable to the refiner.

In catalytic cracking, high molecular weight hydrocarbons are converted to lower molecular weight hydrocarbons of suitable volatility to permit their use as liquid fuels. The combustion characteristics of gasoline are assessed empirically by assigning the fuel an octane rating. This is generally defined as a comparison with a primary reference which is the percentage of iso-octane (2,2,4-trimethylpentane) in an n-heptane/iso-octane mixture to which the gasoline under examination is equivalent in terms of combustion behavior when considering the octane ratings of n-heptane and iso-octane to be zero and 100 respectively. Both RON and MON can be tested on the same single-cylinder, four-stroke engine of standardized design. For a measurement of RON, the engine speed used is 600 rpm which yields results comparable to an automobile engine operated at low speed. For a measurement of MON, the engine speed is 900 rpm which approximates higher speed cruising conditions. Generally, higher octane numbers are found by the research method compared to the motor method for the same gasoline sample. The average of the RON and MON, known as the road octane number, gives an indication of typical performance in an engine. The higher the octane, the better the combustion behavior in a spark-ignition engine. It has been found that road octane number correlates much more closely to the motor octane number than the research octane. Generally, aromatics and branched paraffinic and olefinic hydrocarbons have higher octane values than acyclic or linear paraffinic hydrocarbons.

In conjunction with catalytic cracking to produce gasoline product, alkylate and potential alkylate may result from the cracking process. This indirectly leads to product of increased octane because high octane, highly branched paraffinic gasoline blending stocks are synthesized from the alkylate and potential alkylate. Unlike cracking, alkylation makes larger branched hydrocarbons from smaller hydrocarbons and these larger branched hydrocarbons are inherently higher in octane.

The use of additive catalyst comprising the present improved catalyst in hydrocarbon cracking not only provides a high octane product and a boost in product alkylate and potential alkylate, but significantly more light olefins, especially propylene. The increase in propylene product at the expense of other olefins is an unexpected, very valuable occurrence. The propylene is high quality, petrochemical grade, and may be used for manufacture of valuable ethers and/or alcohols. In this process, the present improved catalyst provides comparable catalytic performance compared to the best of presently used FCC additive catalysts, except for a higher incremental selectivity to propylene. Further, the present improved additive catalyst provides catalyst usage improvements, such as ease of handling, loading, and processing, all found desirable by refiners.

The feedstock, that is, the hydrocarbons to be cracked in the process using the present improved catalyst, may include in whole or in part, a gas oil (e.g., light, medium, or heavy gas oil) having an initial boiling point above 204° C., a 50% point range of at least 260° C. and an end point range of at least 315° C. The feedstock may also include vacuum gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 400° C. must be carried out under vacuum in order to avoid thermal cracking. The boiling temperatures utilized herein are expressed in terms of convenience of the boiling point corrected to atmospheric pressure. Resids or deeper cut gas oils with high metals contents can also be cracked using the improved catalyst of this invention.

Catalytic cracking units which are amenable to the process using the improved catalyst of the invention operate at temperatures from about 200° C. to about 870° C. and under reduced, atmospheric or superatmospheric pressure. The catalytic process can be either fixed bed, moving bed or fluidized bed and the hydrocarbon flow may be either concurrent or countercurrent to the catalyst flow. The process of the invention is particularly applicable to the Fluid Catalytic Cracking (FCC) or Thermofor Catalytic Cracking (TCC) processes. In both of these processes, the hydrocarbon feed and catalyst are passed through a reactor and the catalyst is regenerated. The two processes differ substantially in the size of the catalyst particles and in the engineering contact and transfer which is at least partially a function of catalyst size.

The TCC process is a moving bed and the catalyst is in the shape of pellets or beads having an average particle size of about one-sixty-fourth to one-fourth inch. Active, hot catalyst beads progress downwardly cocurrent with a hydrocarbon charge stock through a cracking reaction zone. The hydrocarbon products are separated from the coked catalyst and recovered, and the catalyst is recovered at the lower end of the zone and regenerated.

Typically preferred TCC conversion conditions include an average reactor temperature of from about 450° C. to about 510° C.; catalyst/oil volume ratio of from about to about 7; reactor space velocity of from about to about 2.5 vol./hr./vol.; and recycle to fresh feed ratio of from 0 to about 0.5 (volume).

The catalyst prepared hereby is particularly applicable to Fluid Catalytic Cracking. In fluidized catalytic cracking processes, the catalyst is a fine powder of abut 10 to 200 microns. This powder is generally suspended in the feed and propelled upward in a reaction zone. A relatively heavy hydrocarbon feedstock, e.g., a gas oil, is admixed with a suitable cracking catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbons from the spent catalyst prior to conveying the latter to a catalyst regenerator unit, an inert stripping gas, e.g., steam, is passed through the catalyst bed where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Gas from the FCC main-column overhead receiver is compressed and directed with primary-absorber bottoms and stripper overhead gas through a cooler to the high pressure receiver. Gas from this receiver is routed to the primary absorber, where it is contacted by the unstabilized gasoline from the main-column overhead receiver. The net effect of this contacting is a separation between $C_{3}+$ and $C_{2}-$ fractions in the feed to the primary absorber. Primary absorber off-gas is directed to a secondary or sponge absorber, where a circulating stream of light cycle oil from the main column is used to absorb most of the remaining $C_{5}+$ material in the sponge absorber feed. Some $C_3$ and $C_4$ materials are also absorbed. The sponge-absorber rich oil is returned to the FCC main column. The sponge-absorber overhead, with most of the valuable $C_{4}+$ material removed but including $H_2S$, is sent to the fuel gas or other process streams.

Liquid from the high pressure separator is sent to a stripper where most of the $C_{2}-$ is removed overhead and sent back to the high pressure separator. The bottoms liquid from the stripper is sent to the debutanizer, where an olefinic $C_3-C_4$ product is further separated for gasoline production. The debutanizer bottoms, that is, the stabilized gasoline, are sent to treating, if necessary, and then to storage. The $C_3$ and $C_4$ product olefins can be directed to an alkylation unit to produce a high octane gasoline by the reaction of an iso-paraffin (usually iso-butane) with one or more of the low molecular weight olefins (usually propylene and butylene).

The FCC conversion conditions include a riser top temperature of from about 500° C. to about 595° C., preferably from about 520° C. to about 565° C., and most preferably from about 530° C. to about 550° C.; catalyst/oil weight ratio of from about 3 to about 12, preferably from about 4 to about 11, and most preferably from about 5 to about 10; and catalyst residence time of from about 0.5 to about 15 seconds, preferably from about 1 to about 10 seconds.

The cracking catalyst can contain any active component which has cracking activity. The active component may be a conventional large-pore molecular sieve including zeolite X (U.S. Pat. No. 2,882,442); REX; zeolite Y (U.S. Pat. No. 3,130,007); Ultrastable Y zeolite (USY) (U.S. Pat. No. 3,449,070); Rare Earth exchanged Y (REY) (U.S. Pat. No. 4,415,438); Rare Earth exchanged USY (REUSY); Dealuminated Y (DEAL Y) (U.S. Pat. Nos. 3,442,792; 4,331,694); Ultrahydrophobic Y (UHPY) (U.S. Pat. No. 4,401,556); and/or dealuminated silicon-enriched zeolites, e.g., LZ-210 (U.S. Pat. No. 4,678,765). Preferred are higher silica forms of zeolite Y. Zeolite ZSM-20 (U.S. Pat. No. 3,972,983); zeolite Beta (U.S. Pat. No. 3,308,069); zeolite L (U.S. Pat. Nos. 3,216,789; and 4,701,315); and naturally occurring zeolites such as faujasite, mordenite and the like may also be used. These materials may be subjected to conventional treatments, such as impregnation or ion exchange with rare earths to increase stability. These patents are incorporated herein by reference. These large-pore molecular sieves have a pore opening of greater than about 7 Angstroms. In current commercial practice most cracking catalysts contain these large-pore molecular sieves. The preferred molecular sieve of those listed above is a zeolite Y, more preferably an REY, REUSY or a USY.

Other large-pore crystalline molecular sieves include pillared silicates and/or clays; aluminophosphates, e.g., $ALPO_4$-5, $ALPO_4$-8, VPI-5; silicoaluminophosphates, e.g., SAPO-5, SAPO-37, SAPO-31, SAPO-40; and other metal aluminophosphates. These are variously described in U.S. Pat. Nos. 4,310,440; 4,440,871; 4,554,143; 4,567,029; 4,666,875; 4,742,033; 4,880,611; 4,859,314; and 4,791,083, each incorporated herein by reference.

It is conventional to use an additive catalyst with different properties along with the conventional catalyst to form an optional mixed catalyst system. Commercially used additives are shape-selective zeolites. Zeolite having a Constraint Index of 1–12 can be used for this purpose. Details of the Constraint Index test are provided in *J. Catalysis*, 67, 218–222 (1981) and in U.S. Pat. No. 4,711,710 both of which are incorporated herein by reference.

Conventional shape-selective zeolites useful for this purpose are exemplified by intermediate pore (e.g., less than about 7 Angstroms pore size, such as from about 5 to less than about 7 Angstroms) zeolites ZSM-5 (U.S. Pat. No. 3,702,886 and Re. 29,948); ZSM-11 (U.S. Pat. No. 3,709,979); ZSM-12 (U.S. Pat. No. 3,832,449); ZSM-22 (U.S. Pat. No. 4,556,477); ZSM-23 (U.S. Pat. No. 4,076,842); ZSM-35 (U.S. Pat. No. 4,016,245); ZSM-48 (U.S. Pat. No. 4,397,827); ZSM-57 (U.S. Pat. No. 4,046,685); PSH-3 (U.S. Pat. No. 4,439,409); and MCM-22 (U.S. Pat. No. 4,954,325) either alone or in combination. In addition, the catalyst composition may include metals useful in promoting the oxidation of carbon monoxide to carbon dioxide under regenerator conditions as described in U.S. Pat. No. 4,350,614.

As will be demonstrated hereinafter, use of the present improved catalyst as the additive catalyst in the above-detailed cracking process provides unexpected improvements relative use of conventional, yet similar, catalysts.

In order to more fully illustrate the nature of the invention and the manner of practicing same, the following examples are presented. In the examples, whenever adsorption data are set forth for comparison of sorptive capacities for water, cyclohexane and n-hexane, they are determined as follows:

A weighed sample of the calcined adsorbant is contacted with the desired pure adsorbate vapor in an adsorption chamber, evacuated to 1 mm and contacted with 12 mm Hg of water vapor or 20 mm Hg of n-hexane, or cyclohexane vapor, pressures less than the vapor-liquid equilibrium pressure of the respective adsorbate at room temperature. The pressure is kept constant (within about ±0.5 mm) by addition of absorbate vapor controlled by a manostat during the adsorption period, which does not exceed about 8 hours. As adsorbate is adsorbed by the sorbant material, the decrease in pressure causes the manostat to open a valve which admits more adsorbate vapor to the chamber to restore the above control pressures. Sorption is complete when the pressure change is not sufficient to activate the manostat. The increase in weight is calculated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis*, 4, 527 (1965); 6, 278 (1966); and 61, 395 (1980), each incorporated herein by reference as to that description. The experimental conditions of the test used herein include a constant temperature of 538° C. and a variable flow rate as described in detail in the *Journal of Catalysis*, 61, 395.

Example 1

A solution containing 1.53 parts 50% NaOH solution in 1.89 parts H$_2$O was added to a solution containing 1 part Al$_2$(SO$_4$)$_3$ xH$_2$O (17.2% Al$_2$O$_3$) in 7.63 parts H$_2$O. To this mixture was added 3.38 parts Ultrasil (VN3SP) precipitated silica and 0.09 part ZSM-5 seeds followed by 0.39 part n-propylamine. The Ultrasil used is a precipitated, spray-dried silica manufactured by DeGussa Corporation containing about 90 wt.% SiO$_2$. The mixture was stirred until uniform. The reaction mixture had the following composition in mole ratios:

| | |
|---|---|
| SiO$_2$/Al$_2$O$_3$ = | 30.0 |
| OH$^-$/SiO$_2$ = | 0.18 |
| R/SiO$_2$ = | 0.13 |
| H$_2$O/SiO$_2$ = | 13.3 |
| Na$^+$/SiO$_2$ = | 0.38 |
| % solids = | 18.0 | where R=n-propylamine.

The mixture was crystallized in a stirred reactor at 160° C. for 26 hours. The crystals were filtered, washed with water, and dried at 120° C. A portion of the product was submitted for X-ray analysis and identified as having the structure of ZSM-5.

The chemical composition of the product crystalline material was, in wt.%:

| | |
|---|---|
| N = | 1.3 |
| Na = | 1.2 |
| Al$_2$O$_3$ = | 5.5 |
| SiO$_2$ = | 72.3 |
| Ash (1000° C.) = | 88.4 |
| SiO$_2$/Al$_2$O$_3$, molar = | 22.3 |
| Carbon = | 4.2 |

The sorption capacities and surface area, after calcining the product crystalline material for 16 hours at 538° C., were determined to be:

| | |
|---|---|
| Cyclohexane, 40 Torr, wt. % = | 7.6 |
| n-Hexane, 40 Torr, wt. % = | 11.4 |
| H$_2$O, 12 Torr, wt. % = | 9.2 |
| Surface Area, m$^2$/g = | 286 |

SEM analysis of the product material revealed a polycrystalline solid showing crystal facets of ZSM-5.

A calcined (3 hours at 538° C. in air) portion of the product of this example was ammonium exchanged with 10% NH$_4$Cl solution to a sodium level of 34 ppm and calcined again to obtain the hydrogen form. The Alpha Value of this material was 1200.

EXAMPLE 2

For comparison purposes, ZSM-5 crystals used commercially for additive catalyst were synthesized. In that synthesis, a solution containing 1.28 parts 50% NaOH solution in 8.49 parts H$_2$O was added to a solution containing 1 part Al$_2$(SO$_4$)$_3$xH$_2$O 47% solution (8.1 wt.% Al$_2$O$_3$). To this mixture was added 5.24 parts Ultrasil (VN3SP) precipitated silica, 0.04 part ZSM-5 seeds, 0,008 part Daxad-23, and 0.72 part 26% brine solution, followed by 0.46 part n-propylamine. The mixture was stirred until uniform. The reaction mixture had the following composition in mole ratios:

| | |
|---|---|
| SiO$_2$/Al$_2$O$_3$ = | 78.2 |
| OH$^-$/SiO$_2$ = | 0.07 |
| R/SiO$_2$ = | 0.10 |
| H$_2$O/SiO$_2$ = | 6.8 |
| Na$^+$/SiO$_2$ = | 0.26 |
| % solids = | 28.4 | where R=n-propylamine.

The mixture was crystallized in a stirred reactor at 149° C. for 7 hours. The crystals were filtered, washed with water, and dried at 120° C. A portion of the product was submitted for X-ray analysis and identified as having the structure of ZSM-5.

The chemical composition of the product crystalline material was, in wt.%:

| | |
|---|---|
| Na = | <0.5 |
| Al$_2$O$_3$ = | 5.3 |
| SiO$_2$ = | 83.7 |
| Ash (1000° C.) = | 89 |
| SiO$_2$/Al$_2$O$_3$, molar = | 55 |

The surface area of this material was determined to be 340 m$^2$/g.

A calcined portion of the product of this example was ammonium exchanged with 1N NH$_4$NO$_3$ to a sodium level of 121 ppm. The Alpha Value of this material was 800.

EXAMPLE 3

Again for comparison purposes, another ZSM-5 material used commercially for additive catalyst was synthesized. In that synthesis, a solution containing 1.54 parts 50% NaOH solution was added to a solution containing 1 part Al$_2$(SO$_4$)$_3$.xH$_2$O (17.2% Al$_2$O$_3$) in 10.1 parts H$_2$O. To this mixture was added 3.43 parts Ultrasil (VN3SP) precipitated silica. The mixture was stirred until uniform. The reaction mixture had the following composition in mole ratios:

| | |
|---|---|
| SiO$_2$/Al$_2$O$_3$ = | 32.7 |
| OH$^-$/SiO$_2$ = | 0.17 |
| R/SiO$_2$ = | 0 |
| H$_2$O/SiO$_2$ = | 11.0 |
| Na$^+$/SiO$_2$ = | 0.35 |
| % solids = | 21.0 |

The mixture was crystallized in a stirred reactor at 160° C. for about 24 hours. The crystals were filtered, washed with water, and dried at 120° C. A portion of the product was submitted for X-ray analysis and identified as having the structure of ZSM-5.

The chemical composition of the product crystalline material was:

| | | |
|---|---|---|
| Na = | 1358 | ppm |
| Al$_2$O$_3$ = | 10.4 | wt. % |
| SiO$_2$ = | 84.7 | wt. % |
| Ash (1000° C) = | 95.1 | wt. % |
| Carbon = | 0 | |

-continued

| | |
|---|---|
| $SiO_2/Al_2O_3$, molar = | 26 |

The surface area of the product material was determined to be 340 m²/g.

A portion of the product of this example was ammonium exchanged with 1N $NH_4NO_3$ to a sodium level of 656 ppm. The Alpha Value of this material was 1361.

EXAMPLE 4

Another ZSM-5 material useful for commercial additive catalyst was synthesized for comparison purposes. A solution containing 0.72 part 50% NaOH solution in 4.15 parts $H_2O$ was added to a solution containing 1 part $Al_2(SO_4)_3 \cdot xH_2O$ 47% solution (8.1% $Al_2O_3$). To this mixture was added 1.63 parts HiSil-233 precipitated hydrated silica manufactured by PPG Industries containing about 87 wt.% $SiO_2$, about 6 wt.% free $H_2O$, and about 4.5 wt.% bound $H_2O$ of hydration. The mixture was stirred until uniform. The reaction mixture had the following composition in mole ratios:

| | |
|---|---|
| $SiO_2/Al_2O_3$ = | 27.0 |
| $OH^-/SiO_2$ = | 0.18 |
| $R/SiO_2$ = | 0 |
| $H_2O/SiO_2$ = | 10.0 |
| $Na^+/SiO_2$ = | 0.40 |
| % solids = | 26.7 |

The mixture was crystallized in a stirred reactor at 160° C. for 46 hours. The crystals were filtered, washed with water, and dried at 120° C. A portion of the product was submitted for X-ray analysis and identified as having the structure of ZSM-5.

The chemical composition of the product crystalline material was, in wt.%:

| | |
|---|---|
| Na = | 2.6 |
| $Al_2O_3$ = | 6.2 |
| $SiO_2$ = | 83.6 |
| Ash (1000° C.) = | 92.5 |
| $SiO_2/Al_2O_3$, molar = | 26 |

The surface area of this material was determined to be 299 m²/g.

A portion of the product of this example was ammonium exchanged with 1N $NH_4NO_3$ to a sodium level of 384 ppm. The Alpha Value of this material was 850.

EXAMPLES 5-11

Additional examples of synthesis of the particular ZSM-5 crystals needed for this invention were carried out with the reaction mixture, crystallization, and product details presented in Table 2 below. Reaction mixture composition is given in molar ratios. Adsorption and surface area data were obtained on material having been calcined at 538° C. as in Examples 1-4. Alpha Values were obtained, as in Examples 1-4, for the hydrogen forms of the crystalline materials.

TABLE 2

| | Example | | | | | | |
|---|---|---|---|---|---|---|---|
| | 5 | 6 | 7 | 8 | 9 | 10 | 11 |
| Reaction Mixture | | | | | | | |
| $SiO_2/Al_2O_3$ | 30.0 | 30.0 | 30.0 | 30.0 | 30.0 | 30.0 | 30.0 |
| $OH^-/SiO_2$ | 0.18 | 0.18 | 0.18 | 0.18 | 0.18 | 0.18 | 0.18 |
| $R/SiO_2$ | 0.13 | 0.13 | 0.13 | 0.02 | 0.13 | 0.13 | 0.04 |
| $H_2O/SiO_2$ | 20.0 | 14.7 | 14.7 | 11.5 | 20.0 | 11.3 | 11.5 |
| $Na^+/SiO_2$ | 0.3 | 0.38 | 0.38 | 0.38 | 0.38 | 0.38 | 0.38 |
| Seeds | No | Yes | Yes | Yes | No | Yes | Yes |
| Crystallization | | | | | | | |
| Temp, °C. | 175 | 175 | 175 | 175 | 175 | 160 | 160 |
| Time, hrs. | 48 | 48 | 48 | 48 | 24 | 23 | 27 |
| Crystallinity, % | 100 | 110 | 85 | 95 | 105 | 95 | 90 |
| Composition | | | | | | | |
| N, wt. % | 1.90 | 2.05 | 1.85 | 0.30 | 1.4 | 1.3 | 0.75 |
| Na, wt. % | 0.14 | 0.19 | 0.37 | 2.3 | 0.85 | 1.4 | 1.2 |
| $SiO_2/Al_2O_3$ | 24.7 | 20.3 | 28.2 | 25.3 | 25.0 | 24.6 | 24.5 |
| Adsorption, % | | | | | | | |
| Cyclohexane | 7.6 | 6.8 | 6.9 | 4.9 | 6.5 | 6.7 | 7.1 |
| n-Hexane | 12.1 | 12.2 | 11.0 | 9.1 | 10.9 | 10.0 | 9.0 |
| $H_2O$ | 11.0 | 10.1 | 8.7 | 9.6 | 9.5 | 9.2 | 8.9 |
| Surface Area, m²/g | 323 | 328 | 306 | 218 | 279 | 267 | 262 |
| Alpha Value | 1373 | 949 | 1488 | — | — | 953 | 1131 |

EXAMPLE 12

Catalysts were prepared using the products of Examples 1, 2, 3, and 4. An additional catalyst was prepared using the product of a repeat of Example 3 (hereinafter 3') except that the initial sodium content of the synthesis product was 2.7 wt.%, and the product of ammonium exchange with 1N $NH_4NO_3$ had a sodium level of 0.15 wt.%. As-synthesized portions of the zeolite products were ammonium exchanged with 1N $NH_4NO_3$, washed with deionized water, and dried at 120° C. to form drycake. A 30 wt.% solids slurry of each drycake was ball-milled to reduce mean particle size in each instance to about 2.3-3.6 μm.

The milled slurries were combined with silica-alumina and clay matrix to form 25 wt.% ZSM-5 fluid catalysts. The matrix in each case contained 35 wt.% Kaopaque 10 S kaolin clay and 65 wt.% silica-alumina gel. The gel contained 93 wt.% silica from Q-Brand sodium silicate and 7 wt.% alumina from aluminum sulfate. The gel was formed at 10 to 13° C. at 8.6 wt.% solids. Sixty-five percent of the sodium in the sodium silicate was neutralized with sulfuric acid added to the slurries.

After spray drying at an average outlet temperature of 179° C., the catalysts were ammonium exchanged by contact with 1N $NH_4OH$ at room temperature for 6 hours to remove sodium introduced by the matrix.

Small portions of each catalyst were calcined in a muffle furnace in air at 538° C. for 2 hours to obtain samples which were submitted for determination of analytical properties and Alpha Values. The remainder of each catalyst was steamed for 10 hours at 788° C. with 45% steam and 55% air at atmospheric pressure. Samples of the steamed catalysts were also submitted for determination of analytical properties and Alpha Values. Results of these tests are presented in Table 3.

TABLE 3

Comparison of Catalyst Properties

| | Zeolite Example | | | | |
|---|---|---|---|---|---|
| | 1 | 2 | 3 | 3' | 4 |
| Calcined Catalyst | | | | | |
| Sodium, ppm | 57 | 128 | 93 | 170 | 131 |
| Sorptions, g/100 g | | | | | |
| Water | 11.3 | NA | 6.6 | NA | 8.2 |
| n-$C_6$ | 8.5 | NA | 10.2 | NA | 9.7 |
| cy-$C_6$ | 8.2 | NA | 9.6 | NA | 9.3 |
| Real Density, g/cc | 2.26 | 2.36 | 2.36 | NA | 2.37 |
| Particle Density, g/cc | 1.29 | 1.18 | 1.15 | NA | 1.11 |
| Pore Volume, cc/g | 0.33 | 0.43 | 0.44 | NA | 0.48 |
| Surface Area, m$^2$/g | 263 | 298 | 273 | NA | 275 |
| Alpha Value | 303 | 85 | 140 | NA | 53 |
| Steamed Catalyst | | | | | |
| Sorptions, g/100 g | | | | | |
| Water | 1.4 | NA | NA | NA | 1.2 |
| n-$C_6$ | 2.9 | NA | 2.7 | NA | 2.6 |
| cy-$C_6$ | 3.5 | NA | 3.3 | NA | 2.9 |
| Real Density, g/cc | 2.36 | NA | 2.37 | NA | 2.37 |
| Particle Density, g/cc | 1.44 | NA | 1.29 | NA | 1.23 |
| Pore Volume, cc/g | 0.27 | NA | 0.35 | NA | 0.39 |
| Surface Area, m$^2$/g | 73 | NA | 98 | NA | 84 |
| Alpha Value | 3 | NA | 3 | 2 | 3 |

EXAMPLE 13

Cracking catalyst blends were prepared by mixing a commercial cracking catalyst composed of 15 wt.% REY and 85 wt.% silica-based matrix with each of the additive catalysts prepared in Example 12. Catalysts A and E are samples of the present invention. Catalysts B, C, C', D, F, G, H, and I are commercial formulations. Catalyst I was made using as additive catalyst a commercially available material comprising 25 wt.% ZSM-5 as prepared in Example 2. Catalyst I was steamed 10 hours at 788° C. with 100% steam at 6 psig. The mixed catalysts were as follows:

| Catalyst | Wt. % Additive | Wt. % ZSM-5 | From Example |
|---|---|---|---|
| A | 8 | 2 | 1 |
| B | 8 | 2 | 2 |
| C | 8 | 2 | 3 |
| C' | 8 | 2 | 3' |
| D | 8 | 2 | 4 |
| E | 2 | 0.5 | 1 |
| F | 2 | 0.5 | 2 |
| G | 2 | 0.5 | 3 |
| H | 2 | 0.5 | 4 |
| I | 2 | 0.5 | Commercial |

EXAMPLE 14

The commercial REY cracking catalyst used in Example 13 and additive catalyst/cracking catalyst mixtures prepared in Example 13 were evaluated in a fixed-fluidized bed cracking unit with Joliet Sour Heavy Gas Oil feedstock at 515° C. and 1 minute on stream. The catalyst/oil ratios of the tests were varied through a range of from 3 to 6 to provide a range of conversions. Results of these tests at 70% conversion are presented in Table 4 for the REY catalyst and Catalysts A, C, and D.

Table 6 presents the test results for the REY catalyst and Catalysts E and I. Tables 5 and 7 present selectivity and activity comparisons between the catalysts.

The results of these tests indicate that the additive catalyst comprising the catalyst composition of the present invention produces more alkylate and gasoline plus potential alkylate, and more propylene than the other additive catalysts.

TABLE 4

(70 vol. % Conversion)

| | | ← Δ → | | |
|---|---|---|---|---|
| Catalyst | REY | C | D | A |
| $C_5+$ Gasoline, vol. % | 52.4 | (4.0) | (4.4) | (6.2) |
| $C_4$s, vol. % | 14.4 | 2.4 | 3.0 | 0.6 |
| $C_3$s, vol. % | 10.4 | 1.4 | 1.5 | 5.0 |
| $C_2-$, wt. % | 3.3 | (0.2) | (0.4) | 0.5 |
| Coke, wt. % | 7.1 | 0.9 | 1.1 | 0.5 |
| Alkylate, vol. % | 20.8 | 5.4 | 4.9 | 8.0 |
| G + PA, vol. % | 73.2 | 1.4 | 0.5 | 1.8 |
| n-$C_5$, vol. % | 0.4 | (0.1) | (0.1) | (0.1) |
| i-$C_5$, vol. % | 6.6 | 0.1 | 0.6 | (1.2) |
| $C_5=$, vol. % | 3.8 | 0.1 | — | (0.3) |
| n-$C_4$, vol. % | 0.8 | 0.4 | 0.4 | 0.3 |
| i-$C_4$, vol. % | 8.2 | 0.4 | 1.1 | (0.2) |
| $C_4=$, vol. % | 5.5 | 1.6 | 1.4 | 0.5 |
| $C_3°$, vol. % | 3.4 | (0.3) | (0.1) | 0.5 |
| $C_3=$, vol. % | 7.1 | 1.6 | 1.4 | 4.0 |
| $C_2$, wt. % | 0.6 | 0.1 | 0.1 | 0.2 |
| $C_2=$, wt. % | 0.8 | (0.1) | (0.2) | 0.1 |
| $C_1$, wt. % | 0.8 | — | — | — |
| $H_2$, wt. % | 0.2 | (0.1) | — | — |
| $H_2S$, wt. % | 0.9 | — | (0.3) | 0.3 |
| Octane, $C_5+$ Gasoline | 91.4 | 0.8 | 1.0 | 0.9 |

TABLE 5

(70 vol. % Conversion)

| Catalyst | C | D | A |
|---|---|---|---|
| Selectivity | | | |
| ($-\Delta C_5+$ Gasoline/$\Delta$ RON) | 5.0 | 4.4 | 6.9 |
| ($-\Delta C_5+$ Gasoline/$\Delta$ PA) | 0.7 | 0.9 | 0.8 |
| $C_3=/C_4=$ (vol. %/vol. %) | 1.2 | 1.2 | 1.9 |
| $\Delta C_3=/\Delta C_4=$ (vol. %/vol. %) | 1.0 | 1.0 | 8.0 |
| $C_3=/C_3°$ (vol. %/vol. %) | 2.8 | 2.6 | 2.9 |
| $\Delta C_3=/\Delta(C_3= + C_3°)$ | 1.2 | 1.1 | 0.9 |
| Activity | | | |
| ($\Delta$ RON/wt. % ZSM-5) | 0.4 | 0.5 | 0.5 |
| ($\Delta$ PA/wt. % ZSM-5) | 2.8 | 2.5 | 4.0 |

TABLE 6

(70 vol. % Conversion)

| | | ← Δ → | |
|---|---|---|---|
| Catalyst | REY | I | E |
| $C_5+$ Gasoline, vol. % | 52.4 | (2.1) | (3.2) |
| $C_4$s, vol. % | 14.4 | 0.8 | 0.2 |
| $C_3$s, vol. % | 10.4 | 0.3 | 2.1 |
| $C_2-$, wt. % | 3.3 | (0.2) | — |
| Coke, wt. % | 7.1 | 0.7 | 0.7 |
| Alkylate, vol. % | 20.8 | 1.1 | 3.8 |
| G + PA, Vol. % | 73.2 | (1.0) | 0.5 |
| n-$C_5$, vol. % | 0.4 | — | (0.1) |
| i-$C_5$, vol. % | 6.6 | (1.1) | (1.1) |
| $C_5=$, vol. % | 3.8 | (0.3) | (0.1) |
| n-$C_4$, vol. % | 0.8 | 0.3 | 0.1 |
| i-$C_4$, vol. % | 8.2 | — | (0.4) |
| $C_4=$, vol. % | 5.5 | 0.4 | 0.5 |
| $C_3°$, vol. % | 3.4 | 0.1 | 0.2 |
| $C_3=$, vol. % | 7.1 | 0.1 | 1.8 |
| $C_2$, wt. % | 0.6 | 0.1 | — |
| $C_2=$, wt. % | 0.8 | (0.2) | — |
| $C_1$, wt. % | 0.8 | — | (0.1) |
| $H_2$, wt. % | 0.2 | — | — |
| $H_2S$, wt. % | 0.9 | (0.1) | — |

TABLE 6-continued (70 vol. % Conversion)

| Catalyst | REY | ←Δ→ I | E |
|---|---|---|---|
| Octane, $C_5+$ Gasoline | 91.4 | (0.4) | 0.3 |

TABLE 7

(70 vol. % Conversion)

| Catalyst | I | E |
|---|---|---|
| Selectivity | | |
| ($-\Delta C_5+$ Gasoline/$\Delta$ RON) | (4.2) | 10.7 |
| ($-\Delta C_5+$ Gasoline/$\Delta$ PA) | 2.3 | 0.8 |
| $C_3=/C_4=$ (vol. %/vol. %) | 1.2 | 1.5 |
| $\Delta C_3=/\Delta C_4=$ (vol. %/vol. %) | 0.3 | 3.6 |
| $C_3=/C_3°$ (vol. %/vol. %) | 2.1 | 2.5 |
| $\Delta C_3=/\Delta(C_3= + C_3°)$ | 0.5 | 0.9 |
| Activity | | |
| ($\Delta$ RON/wt. % ZSM-5) | (0.3) | 0.2 |
| ($\Delta$ PA/wt. % ZSM-5) | 0.5 | 1.9 |

EXAMPLE 15

The evaluation tests of Example 14 are repeated here with Joliet Sour Heavy Gas Oil feedstock at 515° C. and 1 minute on stream. Results of these tests at 65% conversion are presented in Table 8 for the REY catalyst and Catalysts A, B, and C'. Table 9 presents selectivity and activity comparisons between the catalysts.

TABLE 8

(65 vol. % Conversion)

| Catalyst | REY | ←Δ→ A | B | C' |
|---|---|---|---|---|
| $C_5+$ Gasoline, vol. % | 50.6 | (2.1) | (3.1) | (6.1) |
| $C_4$s, vol. % | 14.2 | — | 1.7 | 4.0 |
| $C_3$s, vol. % | 8.7 | 1.6 | 2.5 | 4.1 |
| $C_2-$, wt. % | 2.5 | (0.1) | 0.1 | 0.5 |
| Coke, wt. % | 4.5 | 0.5 | — | (0.2) |
| Alkylate, vol. % | 23.1 | 4.0 | 5.7 | 7.8 |
| G + PA, vol. % | 73.6 | 1.9 | 2.5 | 1.7 |
| n-$C_5$, vol. % | 0.4 | (0.1) | — | (0.1) |
| i-$C_5$, vol. % | 4.1 | (0.8) | 0.5 | 0.9 |
| $C_5=$, vol. % | 3.6 | — | 1.0 | 0.8 |
| n-$C_4$, vol. % | 1.0 | — | — | — |
| i-$C_4$, vol. % | 6.2 | (0.7) | 0.4 | 2.4 |
| $C_4=$, vol. % | 7.0 | 0.7 | 1.2 | 1.6 |
| $C_3°$, vol. % | 1.8 | (0.1) | 0.3 | 1.1 |
| $C_3=$, vol. % | 6.9 | 1.7 | 2.2 | 3.0 |
| $C_2$, wt. % | 0.5 | 0.1 | — | 0.1 |
| $C_2=$, wt. % | 0.5 | (0.1) | 0.1 | 0.1 |
| $C_1$, wt. % | 0.5 | (0.1) | 0.1 | 0.1 |
| $H_2$, wt. % | 0.2 | (0.1) | — | — |
| $H_2S$, wt. % | 0.8 | 0.1 | — | 0.2 |
| Octane, $C_5+$ Gasoline | 89.5 | — | 1.3 | 2.1 |

TABLE 9

(65 vol. % Conversion)

| Catalyst | A | B | C' |
|---|---|---|---|
| Selectivity | | | |
| ($-\Delta C_5+$ Gasoline/$\Delta$ RON) | — | 2.4 | 2.9 |
| ($-\Delta C_5+$ Gasoline/$\Delta$ PA) | 0.5 | 0.5 | 0.8 |
| $C_3=/C_4=$ (vol. %/vol. %) | 1.1 | 1.1 | 1.2 |
| $\Delta C_3=/\Delta C_4=$ (vol. %/vol. %) | 2.4 | 1.8 | 1.9 |
| $C_3=/C_3°$ (vol. %/vol. %) | 5.1 | 4.3 | 3.4 |
| $\Delta C_3=/\Delta(C_3= + C_3°)$ | 1.1 | 0.9 | 0.7 |
| Activity | | | |
| ($\Delta$ RON/wt. % ZSM-5) | — | 0.7 | 1.1 |
| ($\Delta$ PA/wt. % ZSM-5) | 2.0 | 2.9 | 3.9 |

Changes and modifications in the specifically described embodiments can be carried out without departing from the scope of the invention which is intended to be limited only by the scope of the appended claims.

What is claimed is:

1. A method for manufacture of an improved catalyst composition which comprises:
    (i) forming a reaction mixture hydrogel having a pH of from about 10 to about 14, containing sources of alkali or alkaline earth metal (M) cations; an oxide of trivalent element (X); an oxide of tetravalent element (Y); n-propylamine directing agent (R); and water, said reaction mixture having a composition in terms of mole ratios, within the following ranges:

| | |
|---|---|
| $YO_2/X_2O_3$ | <40 |
| $H_2O/YO_2$ | 10 to 35 |
| $OH^-/YO_2$ | 0.1 to 0.3 |
| $M/YO_2$ | 0.2 to 0.6 |
| $R/YO_2$ | 0.01 to 0.6 |

(ii) maintaining the reaction mixture until crystals of ZSM-5 structure are formed,
    (iii) recovering the ZSM-5 crystals from the reaction mixture,
    (iv) ammonium exchanging the recovered ZSM-5 crystals,
    (v) deagglomerating the ion-exchanged crystals,
    (vi) slurrying a matrix material with the deagglomerated ZSM-5 crystals at a pH of from about 2 to about 12, to yield a ZSM-5/matrix material comprising from about 5 to about 80 wt. % ZSM-5 and from about 20 to about 95 wt. % matrix,
    (vii) drying the ZSM-5/matrix material, and
    (viii) converting the dried ZSM-5/matrix material to the protonic form having an Alpha Value of greater than about 30.

2. The method of claim 1 wherein said step (viii) comprises steps of (1) contacting the dried ZSM-5/matrix material with mineral, carboxylic, or dicarboxylic acid, and (2) calcining the acid treated ZSM-5/matrix material at a temperature of from about 200° C. to about 550° C. for from about 1 minute to about 48 hours.

3. The method of claim 1 wherein said step (viii) comprises steps of (1) ammonium exchanging the dried ZSM-5/matrix material, and (2) calcining the ammonium exchanged ZSM-5/matrix material at a temperature of from about 200° C. to about 550° C. for from about 1 minute to about 48 hours.

4. The method of claim 1 wherein said step (viii) comprises calcining the dried ZSM-5/matrix material at a temperature of from about 200° C. to about 550° C. for from about 1 minute to about 48 hours.

5. The method of claim 1 wherein the ZSM-5/matrix product of step (viii) is steamed in an atmosphere of from about 5 to about 100% steam for from about 1 to about 200 hours at a temperature of from about 300° C. to about 800° C. to produce catalyst having an Alpha Value of from about 1 to about 10.

6. The catalyst composition manufactured by the method of claim 1.

7. The catalyst composition manufactured by the method of claim 2.

8. The catalyst composition manufactured by the method of claim 3.

9. The catalyst composition manufactured by the method of claim 4.

10. The catalyst composition manufactured by the method of claim 5.

11. The method of claim 1 wherein said reaction mixture further comprises seed crystals in sufficient amount to enhance synthesis of said crystals of ZSM-5 structure.

12. The method of claim 11 wherein said seed crystals have the structure of ZSM-5.

13. The method of claim 1 wherein X is aluminum, boron, iron, gallium, indium, or a mixture thereof; and Y is silicon, germanium, tin, or a mixture thereof.

14. The method of claim 1 wherein X comprises aluminum and Y comprises silicon.

15. The method of claim 2 wherein said reaction mixture further comprises seed crystals in sufficient amount to enhance synthesis of said crystals of ZSM-5 structure.

16. The method of claim 3 wherein said reaction mixture further comprises seed crystals in sufficient amount to enhance synthesis of said crystals of ZSM-5 structure.

17. The method of claim 4 wherein said reaction mixture further comprises seed crystals in sufficient amount to enhance synthesis of said crystals of ZSM-5 structure.

18. The method of claim 2 wherein X is aluminum, boron, iron, gallium, indium, or a mixture thereof; and Y is silicon, germanium, tin, or a mixture thereof.

19. The method of claim 2 wherein X comprises aluminum and Y comprises silicon.

20. The method of claim 3 wherein X is aluminum, boron, iron, gallium, indium, or a mixture thereof; and Y is silicon, germanium, tin, or a mixture thereof.

21. The method of claim 3 wherein X comprises aluminum and Y comprises silicon.

22. The method of claim 4 wherein X is aluminum, boron, iron, gallium, indium, or a mixture thereof; and Y is silicon, germanium, tin, or a mixture thereof.

23. The method of claim 4 wherein X comprises aluminum and Y comprises silicon.

24. In a catalyst composition comprising crystals of ZSM-5 structure and matrix, the improvement wherein said catalyst has been manufactured by the method comprising:

(i) forming a reaction mixture hydrogel having a pH of from about 10 to about 14, containing sources of alkali or alkaline earth metal (M) cations; an oxide of trivalent element (X) selected from the group consisting of aluminum, boron, iron, gallium, indium, and mixtures thereof; an oxide of tetravalent element (Y) selected from the group consisting of silicon, germanium, tin, and mixtures thereof; n-propylamine directing agent (R); and water, said reaction mixture having a composition in terms of mole ratios, within the following ranges:

| | |
|---|---|
| $YO_2/X_2O_3$ | <40 |
| $H_2O/YO_2$ | 10 to 35 |
| $OH^-/YO_2$ | 0.1 to 0.3 |
| $M/YO_2$ | 0.2 to 0.6 |
| $R/YO_2$ | 0.01 to 0.6 |

(ii) maintaining the reaction mixture until crystals of ZSM-5 structure are formed, said crystals having a formula on an anhydrous basis
$(x)M_2O:(0.2 \text{ to } 1.4)R_2O:X_2O_3:(y)YO_2$ wherein x is a number greater than 0.1; and y is a number less than about 30, (iii) recovering the ZSM-5 crystals from the reaction mixture, (iv) ammonium exchanging the recovered ZSM-5 crystals, (v) deagglomerating the ion-exchanged crystals, (vi) slurrying a matrix material with the deagglomerated ZSM-5 crystals at a pH of from about 2 to about 12, to yield a ZSM-5/matrix material comprising from about 5 to about 80 wt. % ZSM-5 and from about 20 to about 95 wt. % matrix, (vii) drying the ZSM-5/matrix material, and (viii) converting the dried ZSM-5/matrix material to the protonic form having an Alpha Value of greater than about 30.

25. The composition of claim 24 wherein X comprises aluminum and Y comprises silicon.

26. The composition of claim 24 wherein the product of step (viii) is steamed in an atmosphere of from about 5 to about 100% steam for from about 1 to about 200 hours at a temperature of from about 300° C. to about 800° C. to produce catalyst having an Alpha Value of from about 1 to about 10.

* * * * *